United States Patent
Saus

(10) Patent No.: US 8,005,840 B2
(45) Date of Patent: *Aug. 23, 2011

(54) QUERY RESTRICTION FOR TIMELY AND EFFICIENT PAGING

(75) Inventor: Douglas M. Saus, Platte City, MO (US)

(73) Assignee: Cerner Innovation, Inc., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,905

(22) Filed: Mar. 3, 2010

(65) Prior Publication Data

US 2010/0161610 A1   Jun. 24, 2010

Related U.S. Application Data

(63) Continuation of application No. 11/553,826, filed on Oct. 27, 2006, now Pat. No. 7,698,252.

(51) Int. Cl.
*G06F 17/30* (2006.01)
(52) U.S. Cl. ........................ 707/737; 707/759
(58) Field of Classification Search .......... 707/770, 707/771
See application file for complete search history.

(56) References Cited

U.S. PATENT DOCUMENTS

| 7,356,549 B1 * | 4/2008 | Bruso et al. ............ 707/696 |
| 2006/0106756 A1 * | 5/2006 | Zimmerer ............ 707/1 |
| 2007/0027860 A1 * | 2/2007 | Bestgen et al. ............ 707/5 |

* cited by examiner

*Primary Examiner* — Mohammad Ali
*Assistant Examiner* — Huawen Peng
(74) *Attorney, Agent, or Firm* — Shook, Hardy & Bacon L.L.P.

(57) ABSTRACT

Systems and methods are presented for retrieving records from a database and presenting them to a user through a timely and efficient query restricting process. The query request is then modified through the use of a determined partitioning field and a modified query which partitions the field relative to a partitioning value. Records are retrieved from the database. A small set of records is presented to the user, as is a prompt to retrieve more records. An application which receives query requests determines: restricting fields, partition size and whether or not the partition is within a predetermined range. The application returns a data set and receives requests for more records. These systems and methods provide a storage efficient solution that is particularly useful for maintaining a time efficient user response for a dynamic database.

20 Claims, 5 Drawing Sheets

| ROW_NUMBER () | BIRTH_DT_TM | NAME | PERSON_ID |
|---|---|---|---|
| 1 | 16-SEP-1920 | SMITH, GARY | 165789 |
| 2 | 01-OCT-1934 | SMITH, LARRY | 2345 |
| 3 | 01-MAY-1940 | SMITH, ERIC | 654 |
| 4 | 13-DEC-1942 | SMITH, CARL | 1254 |
| 5 | 30-FEB-1964 | SMITH, ALBERT | 1234 |
| 6 | 23-OCT-1969 | SMITH, BOB | 5678 |
| 7 | 11-JAN-1973 | SMITH, BOB | 9102 |
| 8 | 06-JUN-1973 | SMITH, ERIC | 7689 |
| 9 | 29-MAR-1989 | SMITH, SAM | 2111 |
| 10 | 02-DEC-1999 | SMITH, DENISE | 2344 |
| 11 | 09-JUL-2002 | SMITH, ERIC | 12 |

FIG. 5.

QUERY RESTRICTION FOR TIMELY AND EFFICIENT PAGING

CROSS-REFERENCE TO RELATED APPLICATIONS

This application is a continuation of U.S. patent application Ser. No. 11/553,826, filed on Oct. 27, 2006, the entirety of which is incorporated by reference herein.

STATEMENT REGARDING FEDERALLY SPONSORED RESEARCH OR DEVELOPMENT

Not applicable.

BACKGROUND

Often an organized collection of data, called a database, stores the most vital shared data accessed by computer users. The set of software that controls the organized data is called a Database Management System (DBMS). The DBMS allows data to be stored, organized, retrieved, manipulated, and reported. Many types of businesses use databases for data storage. Banks may store a record of all transactions for all account holders in a database. For instance, monthly statements of account holder transactions may be generated from data obtained from a database, listing transactions for each account holder. A library may store availability of books and the identity of a person who is checking out a number of books together with the titles checked out may be stored in a database. Hospitals may record in a database a variety of information related to patient care including, but not limited to, admission time, patient name, birth date, services performed, drugs administered, expected release date, orders and tasks.

A relational DBMS may be used as the database and represents data as being composed of a number of tables. Each table may include a number of rows and a number of columns. Rows are often referred to as records. Columns are sometimes referred to as attributes or fields. Tables as they are stored in the database may differ from tables that are generated and displayed as a collection of retrieved data. Thus it is possible to distinguish stored fields from displayed fields. In some instances displayed records are only a subset of available fields within a table. In other instances tables are joined together to display selected fields from two or more tables in one display.

Queries, or requests for information that satisfy certain specified criteria, are made of databases. Many popular systems use Structured Query Language (SQL) to form queries that are compatible with the DBMS. Different commercially available databases such as Microsoft SQL Server, Oracle, and DB2 may provide query language functions as part of a supported SQL. While the query as it is presented to the DBMS is typically compatible with the query language of the database vendor, the user software that generates the query spans a wide range of data uses, and so takes on many presentation forms. A user may write his own queries manually in SQL, or intermediate software may translate user indications of desired results into a SQL compatible query. This intermediate software may allow the unsophisticated user to form ad hoc queries or to request formatted reports that in turn get translated into one or more queries.

The trend toward less skilled users querying databases has increased as use of the Internet has proliferated in recent years. Processes that were once performed by skilled computer operators are routinely performed by a customer when a web form, which is displayed in a browser, is completed and returned. Data which is stored in a backend database server must make its way through a network of one or more intermediate servers to a client machine. Users make data requests at the client level and data is retrieved through a loop that extends to the database server.

Currently, any inefficiencies anywhere in the system when a query occurs causes delay to the end user. Users are typically not capable of understanding or mitigating poor responsiveness. Furthermore, many users require information that is current at the time data is requested by the client. For example, in a healthcare environment, medical records for patients must be provided in a timely and efficient manner to a user, such as a healthcare provider. It is unsafe in many settings, such as a healthcare environment, to provide old data, or to have an extended period with a caregiver waiting for the database to become available, finish the operation, or for data to be transferred.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. Embodiments of the present invention relate to systems and methods for retrieval and presentation of database records from a query request made by a user.

One aspect of the present invention provides a computerized method for retrieval of records from a database. A query request for data is received. At least one field of the data is selected as a basis for partitioning the data. A partitioning value for selected fields is determined which restricts the scope of data returned. The size of a partition indicated by the partitioning value is determined, and if the partition size is within a predetermined range, then the partition value is used in conjunction with a query request to return a data set.

In another aspect, the present invention provides a computerized system for retrieval of records of a database. A computer user interacts with a client component which receives a query request from the user. The client component is coupled to an application component which comprises a query request receiver, an adaptive query modifier, and a query output subcomponent. The query request receiver is configured to receive a request for data which is made up of fields. The adaptive query modifier is coupled to the query request receiver and determines partitioning values to partition data through one or more partitioning fields. A query output subcomponent is coupled to the adaptive query modifier and sends a modified query using partitioning values in conjunction with the query request to restrict the data returned. A database component is coupled to the application component and receives the modified query request.

In yet another aspect, the present invention provides a computerized method of presenting records of a database to a user. A query prompt is provided to the user. A query request is produced based on data or indications supplied by the user. The query request is modified to include the restriction of a partition relative to a partitioning value to produce a modified query. A determination is made that the size of the resulting partition is within a predetermined range. Records are retrieved from a database using the modified query and they are presented to a user.

BRIEF DESCRIPTION OF THE SEVERAL VIEWS OF THE DRAWINGS

The present invention is described in detail below with reference to the attached drawing figures, wherein:

FIG. 5 is a display of an exemplary data set relative to a query request which illustrates the operation of embodiments of the invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention provide computerized methods and systems for retrieval and presentation of database records. Having briefly provided an overview of the present invention, embodiments of the invention will be discussed with reference to FIGS. 1-5.

Figure 1:
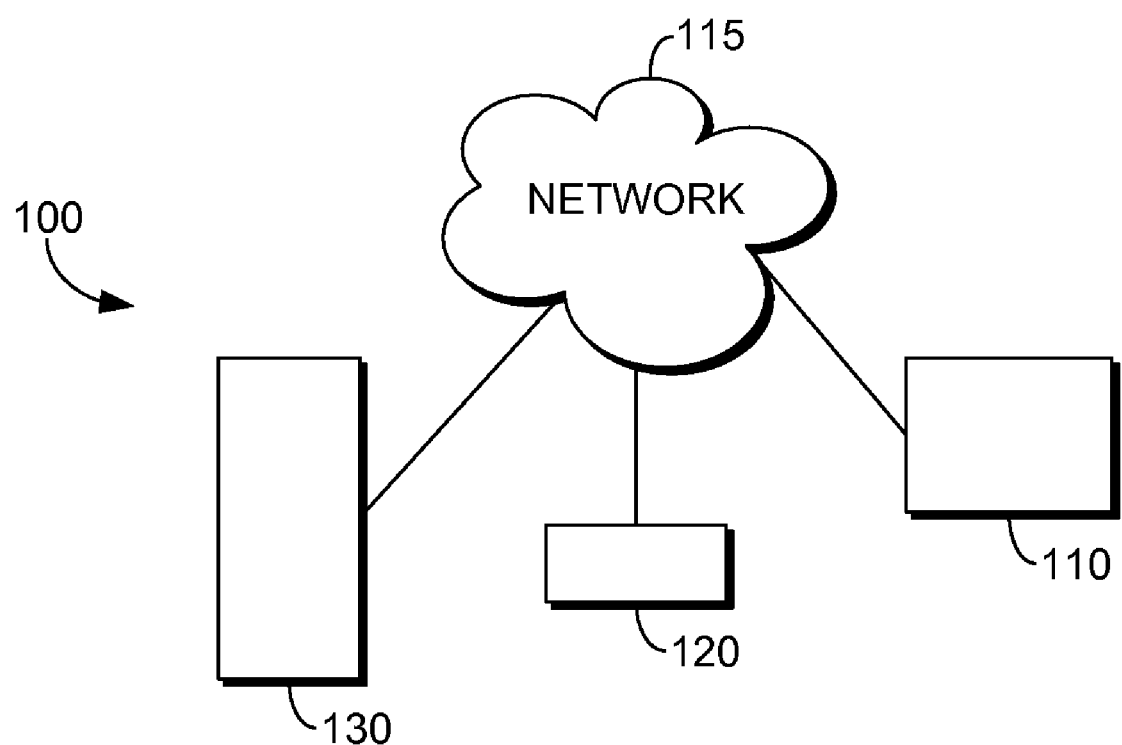
FIG. 1 is a block diagram of an exemplary computing environment suitable for use in implementing embodiments of the present invention.

Referring to the drawings in general, and initially to FIG. 1 an exemplary computing system environment is illustrated and designated generally as reference numeral 100. A client station 110 has access via a network 115 to an application server 120 and a database server 130. Typically a client station 110 is a personal computer such as a desktop system, laptop or hand-held running a suitable operating system and browser. The network 115 consists of the interconnection of two or more machines typically using Transport Control Protocol (TCP) and Internet Protocol (IP) to share data. An application server 120 runs an application program that hosts one or more sessions with clients such as 110, and a database server 130 which runs the DBMS and stores the database.

Many scenarios can produce queries defining large data sets that need not be presented in their entirety immediately. For example, a user may need to locate a single record, but may not remember enough information to uniquely identify the record. In this case, the user indicates the information that is known, and pages through the returned results skimming for the remaining information that identifies the record. In a healthcare context, a user may look for electronic records pertaining to patients named Smith, or all records from the last month, or all records where a certain drug was administered. Such queries may define thousands of records that cannot all be reviewed quickly; at least because the display capabilities to the user are limited, but if results are stored, they may represent undesirable stale data.

The basic problem exists that queries defining large data sets clog the system in various ways, and prior solutions introduce or depend upon stale data. For example, consider a query that defines a data set consisting of 5000 records. The database management system (DBMS) on the database server 130 is burdened with searching for this large set and assembling all these records into memory. This burden affects all other users and processes seeking to access or to change the data in the database on the database server 130. The network is burdened by the transfer of the records from the database server 130 to the application server 120, and again by the transfer from the application server 120 to the client 110. The application server 120 and client 110 may need capacity to store bulky results. If the full data set is queried and stored at the application server 120 or the database server 130, and paged out to the client station 110 the data is stale during paging. Ideally, a solution would not only eliminate the transfers, but also minimize the amount of time that the DBMS is occupied with qualifying the data set.

While the problem description above is made for the sake of clarity with respect to a specific network, in a three machine context, with particular kinds of machines, the same fundamental problem exists for other networks, and other machine contexts, and other machines. For example, the problem could have been stated with respect to a client machine 110 contacting directly a database server 130. Likewise the network could have been defined with respect to an application server 120 interacting with a client machine 110 which is a terminal, or which makes use of a terminal emulator rather than a browser. Similarly, the network 115 could have used a different suite of protocols, or could have been a dedicated network, a virtual private network, an enterprise network, or an interconnection of many dissimilar networks. For the sake of clarity, the solution of the invention will be described largely with respect to an embodiment with regard to three machine context where the client machine 110 is a personal computer running an operating system and browser. Embodiments of the invention are not limited to these constraints or contexts, but embodiments are intended to be practiced in numerous other contexts.

Figure 2:
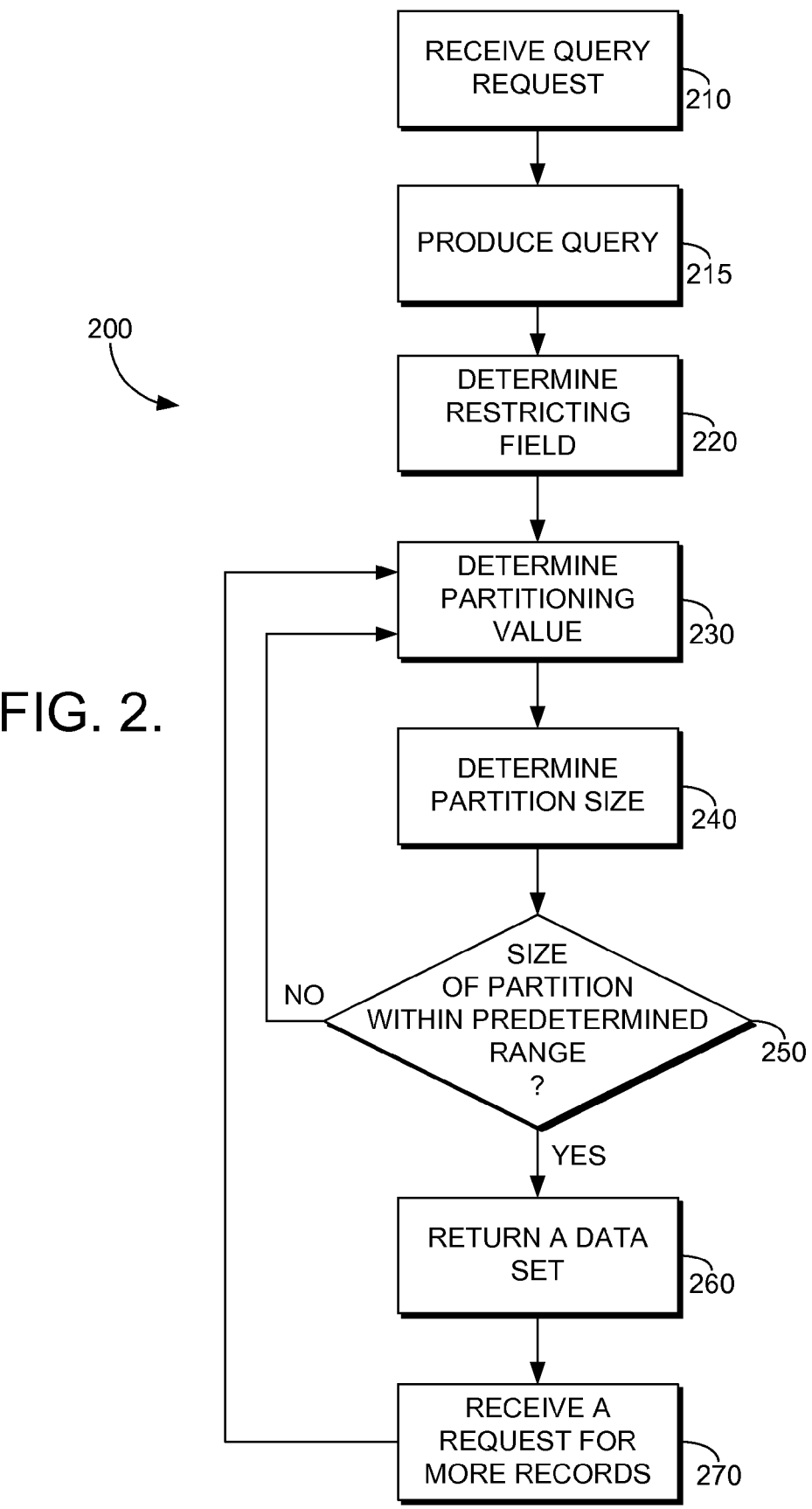
FIG. 2 is a flow diagram showing a method for retrieving records of a database in accordance with an embodiment of the present invention.

Turning now to FIG. 2, a method 200 for retrieving records of a database is shown. At step 210 a query request is received for data. Embodiments of the invention receive the request in a variety of forms. Some embodiments receive a simple text string containing a natural language question which is parsed and interpreted to be translated into query language. Other embodiments receive a logical expression formulating restrictions on the data set in a way that does not require knowledge of any query language. Yet other embodiments receive fully qualified query language requests, or logical expressions representing the substantial portion of a query. The query request determines a logical definition of a set of data, such as "set S." With reference to FIG. 5, an exemplary query request is "last name is smith, order:birthdate" entered by a healthcare clinician.

At step 215, a query, such as a SQL query is produced. In this example, the query will define a set of data or records (such as "set S") with a SQL query "name LIKE Smith,*". With reference to FIG. 5, an exemplary query defining set of records for display as "pn_row_number=row_number( ) over (order by birth_dt_tm), name, person_id".

At step 220, the restricting field is chosen. One or more fields are determined to further restrict the set of data ("set S"). In one embodiment, the field chosen as the restricting field is chosen to provide a good likelihood that the restricting field will represent a range of smooth variation over the data set (set S). Some embodiments determine the restricting field in light of the logical restrictions that defined S. For example, with reference to FIG. 5, an exemplary query is made over a database consisting of four fields: birth date, name, and identification number. If the query request specified restrictions on the name field, but not on the birth date field, an embodiment chooses birth date as a partitioning field. If the query request specified restrictions on the birth date field, but not on the name field, then an embodiment chooses the name field as a partitioning field. For less restrictive query requests, embodiments choose more than one field to simultaneously restrict ranges on two or more fields. For more restrictive query requests, embodiments include logic to determine restricting fields based on continuity of the data, or the success of past choices. In the example of FIG. 5, the field chosen as the restricting field designated for ordering and presentation to the user. In this case, the partitioning field is "birth date" as the query request "last name is smith, order:birthdate" entered by the clinician designated the order to be by birth date. Thus, some embodiments allow a user, such as a clinician, to explicitly indicate the basis of display order. Others embodiments determine the partitioning field, and thus, order presented, according to a preset constant or by context.

The field chosen as the restricting field is recorded in the database. The restricting field recorded may be in a different format than that displayed to the user. For example, a date field may be displayed as text in a number of different formats, but the database may store this as an integer, while using a corresponding conversion routine to convert the field value to a displayable format. As is known in the art, text fields may also be chosen as a basis of partitioning through transformation and conversion to a suitable encompassing numerical base. Exemplary partitioning of data sets is described with respect to the choice of a single numerical restricting field. However, it will be appreciated that the multiple restricting fields may be utilized.

As further represented in FIG. 2, at step 230 partitioning values are determined. A partitioning value, such as a starting and ending point, within the restricting field(s) of the set of data. For example, with reference to FIG. 5, a partitioning value when the restricting field is "birth date" for patients with the last name of Smith is determined to be all records before Jul. 4, 2009.

At step 240, the partition size is determined. The partition size is determined by counting the number of records within the partition defined by the partitioning value. The partition is the data set restricted by the partitioning value and may comprise a number of records. The records are counted by sending a special query to the database where the records count be returned, but no records. For example with reference to FIG. 5, for a partitioning value for "all records before Jul. 4, 2009", the records are counted and it is determined there are that there are 11 records before Jul. 4, 2009. In another embodiment, the partitioning value is "all records for patients with the last name of Smith between Jan. 1, 1960 and Jul. 4, 2009". The number of records between Jan. 1, 1960 and Jul. 4, 2009 are counted and it is determined that there are seven (7) records between Jan. 1, 1960 and Jul. 4, 2009.

At step 250 it is determined whether the partition size determined at step 240 is within a predetermined range. For example, if the predetermined range is a minimum of three (3) records and a maximum of ten (10) records, a partition size of eleven (11) records is too large and not within the predetermined range. The process is sent back to step 230 to determine a partitioning value that will deliver a partition size within the predetermined range. The method continues iterating until the conditional test at step 250 is satisfied, at which point the method proceeds to step 260.

At step 230 a search for the correct value is started by taking the average of the previous value and an estimated minimum for birth date which yields a second partitioning value. For example, with reference to FIG. 5 again, if the first partitioning value for "all records before Jul. 4, 2009" yielded a partition size of eleven (11) records which was not within the predetermined range, a second partition value is determined at step 230.

For example with reference to FIG. 5, a second partitioning value is determined to be records between Jul. 27, 1967 and Jul. 4, 2009 at step 230. The number of records using the second partitioning value are counted at step 240 and it is determined that five (5) records for patient's with the last name of Smith between Jul. 27, 1967 and Jul. 4, 2009. At step 250 as five (5) records satisfies the range of three (3) to ten (10) records, a query is formed and the records are retrieved and returned at step 260.

In general, the goal is to choose a first estimate of the first partitioning value such that a partition is of a size that is "close" to the portion needed for display. The determination of "close" is a trade-off between the penalty for returning a data set at step 260 based on a set which is a little too large, weighed against the penalty of performing further iterations in the loop from steps 230 to 240, from steps 240 to 250 and from step 250 back to step 230. Practical experience indicates that one hundred (100) total records above the desired page size gives good performance when the determination of partition size at step 240 is made by counting records, but not receiving the actual records from the database. Assuming this experience holds, if the number of records needed for display at the client is ten (10), then the partitioning value should be chosen such that the resulting size of the partition is in the range between ten (10) records and 110 records.

At this point the method returns a data set for display to the user at step 260, and if a request is received from the user for more records at step 270, the method proceeds to step 230 to determine a new partitioning value in a fashion similar to that indicated above. The data set that is returned at step 260 includes the records that are able to be displayed comfortably within the browser.

Again with regard to FIG. 2, embodiments of the invention include a broad class of determination algorithms within step 230. The invention is operable without any knowledge of the values present in the database. The method is likely to respond more quickly if estimates are more accurate. Accuracy is likely improved in light of some knowledge of the data within the field being partitioned. For example, if the minimum value, and maximum value are stored or estimated, then an initial value can be chosen to be a fraction of the range like 10% or 1% to minimize the likelihood of having to count the entire database. Such information could be stored as state data, estimated from prior queries, or it could be collected as a background task during idle times. In this way statistics of key useful fields could be used, perhaps including histograms. Such information could also be used as part of the decision to select a partitioning field at step 220. Estimates could also be formed of set of data, and these size estimates could be incorporated into the algorithm that determines the partitioning value.

For example, if a query is generated asking for names that begin with M, some fraction like 1/26 of the full database size could be used as the likely size of data set for names beginning with M. Some embodiments of the invention use binary search to find the final value given a prior partitioning value that does not satisfy the completion criteria. Some embodiments use a constant change of partitioning value to hunt for a value satisfying the criteria. Some embodiments use interpolation or predictive estimates of a good value given prior attempts. Some embodiments retain an estimate of the average size of data sets, and incorporate this into the determination of partition value.

Again with regard to FIG. 2, the determination of partition size at step 240 may be made using a variety of techniques. The measure of size may be a count of the number of records, or it may be line count, or it may be an estimate of the amount of display space needed by a browser. Some embodiments determine size at step 240 by forming a query that returns a count of records rather than returning the actual records themselves; and later performing another query to return the actual records as part of step 260 before a data set is returned. Other embodiments retrieve the records themselves at step 240, and then merely select some subset of the records to be returned at step 260. In the search for a second or subsequent partition value, there are a variety of ways to specify the partitioning value. These options may affect the speed of searching for qualifying data, the return of data that has already been provided to the user when there are repeated values in a partitioning field, and the possibility of returning newly entered data that has been entered into the database after the first page, but before the second page. Embodiments simply store the last record returned, and include the data from that record in subsequent queries, eliminating the repeated data.

Figure 3:
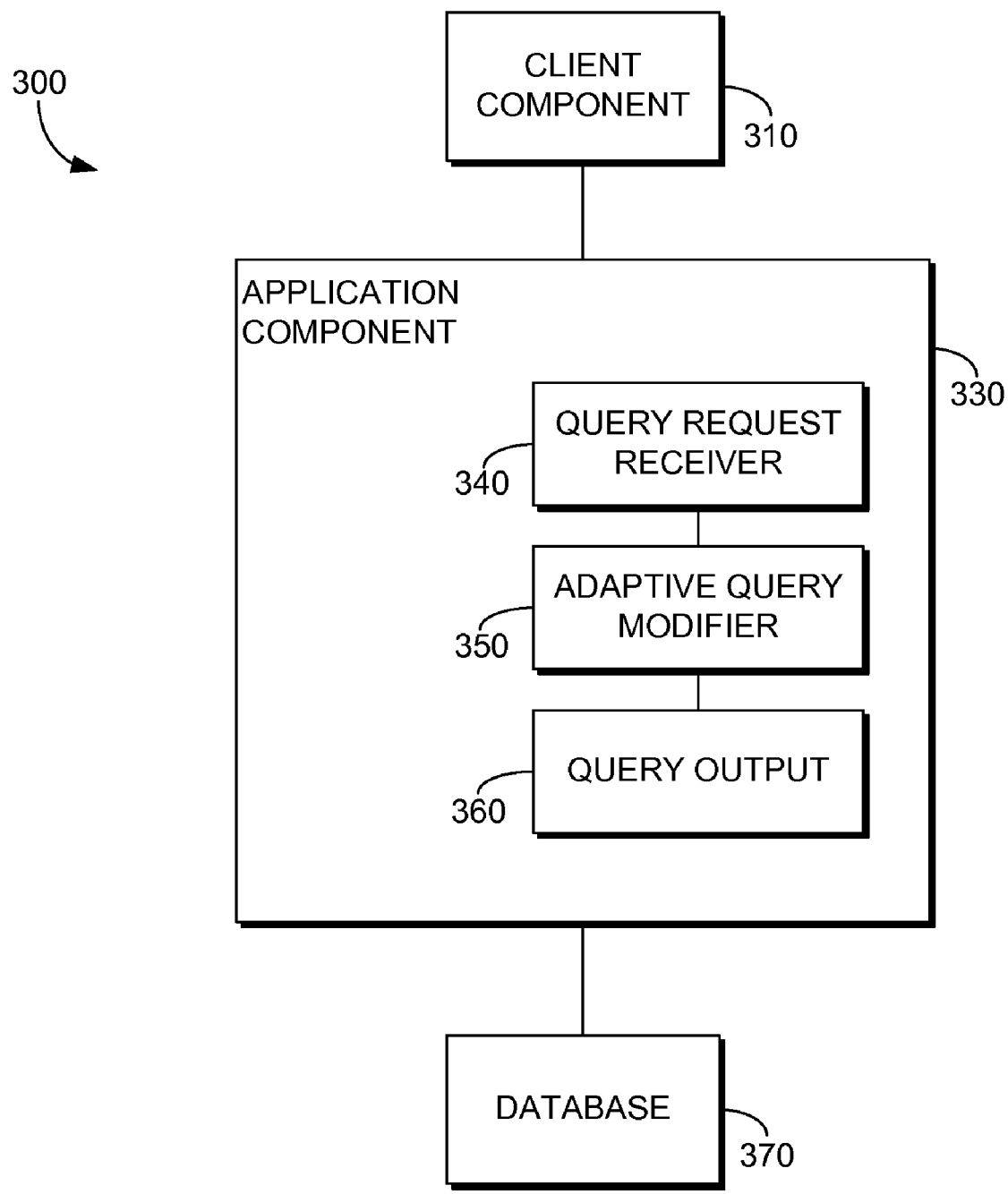
FIG. 3 is a block diagram depicting a system for retrieving records of a database in accordance with an embodiment of the present invention.

Turning now to FIG. 3, an exemplary system 300 for retrieving records of a database is depicted. A client component 310 receives data from a user, or from a program that has directed the formation of a query request. Embodiments place the client component 310 as a program component on a client machine 110 such as a PC, and couple to an application component 330 as a program on an application server such as 120. In this case, the client component 310 may be coupled to the application component 330 by a browser. Other embodiments place both the client component 310 and the application component 330 as program components on the same machine such as a client machine 110 or an application server 120, and couple to one another, for example, through function calls or application program interface (API). A query request receiver component 340 within the application component 330 receives the query request that determines the data set. This component may receive a query request as discussed above in connection with steps 210 or 270. Embodiments of the application component 330 are implemented on a single machine such as 110, 120, or 130. Other embodiments distribute the sub-components of the application component 330 among two or more machines. The coupling of the query request receiver 340 to the adaptive query modifier 350 may likewise be a communication between remote sub-components, or an interface between sub-components or applications on the same machine. The adaptive query modifier component 350 carries out some of the functions of steps 220, 230, 240, and 250 discussed above in conjunction with FIG. 2. The query output sub-component 360 sends a query to the database 370 to return either a number of records or a count of records as discussed in connection with steps 240 and 260. Since embodiments of the invention place the application component 330 or parts of it on the same machine as the database component 370, the coupling between the application component 330 and the database component 370 may be through remote communication or a local program interface.

Figure 4:
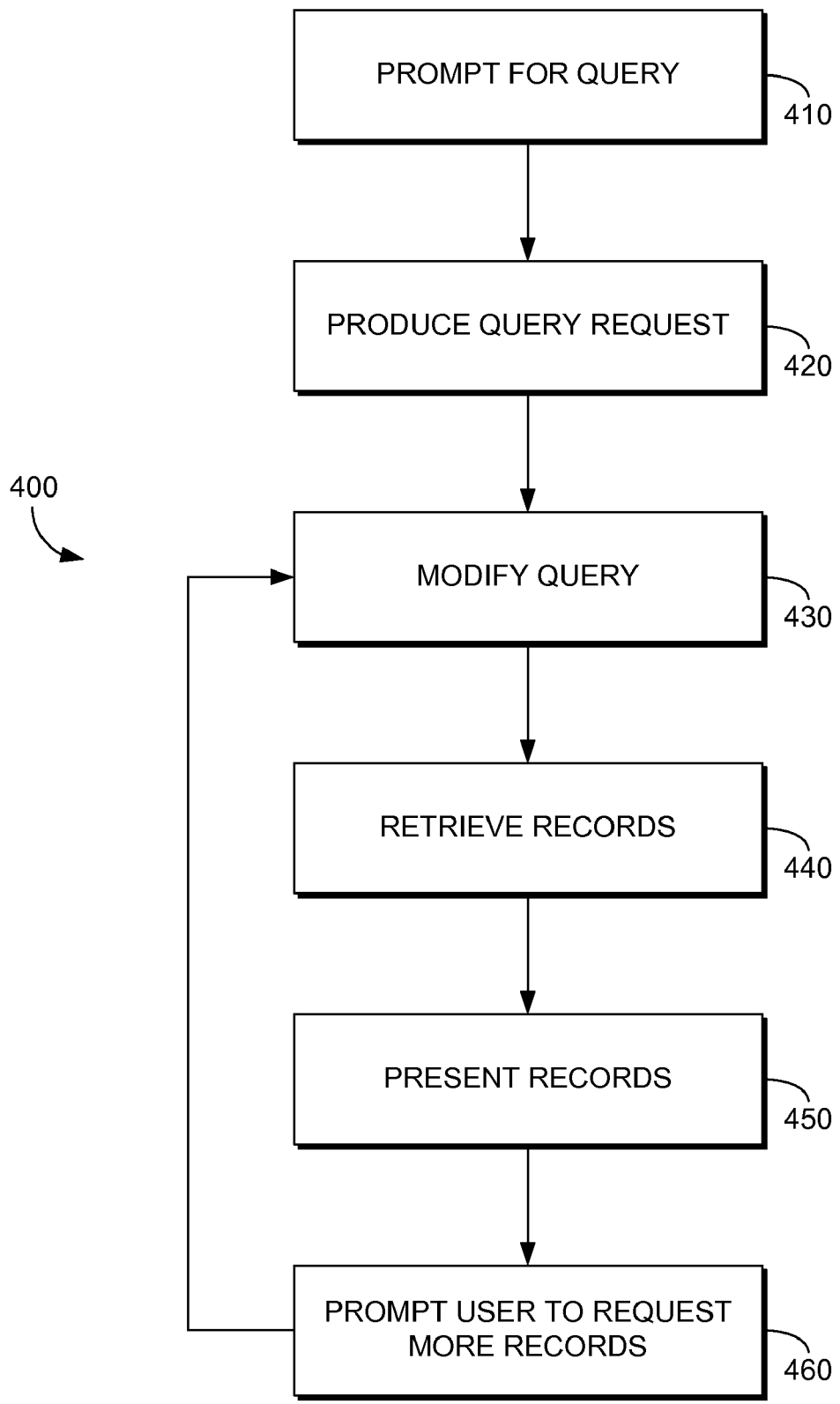
FIG. 4 is a flow diagram showing a method for presenting records of a database to a user in accordance with an embodiment of the present invention.

Turning now to FIG. 4, there is depicted in 400 a flow diagram showing a method for presenting records of a database to a user. At 410 a prompt is provided to the user for a query. Embodiments of the prompt include a hyperlink that, when selected by the user presents the user with a web form to be completed. In general any prompts are included that may lead a user to provide information that specifies a logical definition of a data set ("set S") within the database, thus specifying a query request as would be received by step 210 of FIG. 2. For example, a row of labels could be presented to the user, representing the fields of the database, which when right-clicked would provide a drop down menu list of possible values. Lists may include standard expected search parameters.

As another example a single text form field could be presented to the user next to a button labeled "go". A user can type in a string specifying a query request, either by typing in a natural language request, or by typing in a series of keyword strings perhaps with wild-cards and perhaps separated by logical operators. When the user types in a text string followed by return or selection of the button, this specifies the query request.

As yet another example a series of text fields interspersed with logical operators could be presented allowing the user to form a SQL format logical expression that specifies a query request. As yet another example, a multi-line text box could be provided allowing the user to type a free-form SQL query, or a logical expression that specifies in proper format the essential portion of the query that specifies a set S. At 420 a query request for data comprised of fields is produced. This production is made in conjunction with the design of the associated design of the prompt for query 410. If the prompt was a large text field that receives a logical expression specifying the data set ("set S"), this expression is simply passed on for query modification 430 after perhaps checking for logical consistency or consistent grammar. Those prompts that allow for more human-friendly input perform more processing to put the specification of the data set into a form that may be easily modified at 430. For example, if the query prompt was merely a single text box that received a natural language question, the production of a query request may include parsing the question for extracting key-words, stemming the keywords to allow multiple forms of the keywords, matching of keywords to fields in the database, and construction of a SQL format logical expression specifying the data set.

At 430 the query request is modified as discussed above in association with steps 220, 230, 240, and 250 of FIG. 2. At 440 a set of records is retrieved from a database using the modified query. At 450 at least some of the retrieved records are presented to the user. Embodiments of the method return all available records retrieved in 440 to the user for local caching. Other embodiments return only a certain number of lines, or a certain number of records, or an amount indicated by available space in a browser. At 460 a prompt is provided to the user to request additional records. The prompt may be a hyperlink of the words "next" that results in the sending of a request for additional records, or it may be a notification that a special key is active to perform this function when selected by the user such as "return" or "page down" on a keyboard. The prompt may likewise be a graphical object or an arrow that indicates to the user the availability of more data. The prompt at 460 may be presented contemporaneously with the additional records presented at 450, or it may actually be presented before the records are available, or even before the query is modified in 430 or the records are retrieved in 440. It could also be presented independently, for example, in a help file or an information box for novice users. If a user responds to the prompt, presented at 460, requesting additional records, the method returns to 430 where the query is modified appropriate to the context of the paging application.

Turning now to FIG. 5, there is depicted in 500 an exemplary data set relative to a query request which illustrates the operation of the invention in a single embodiment for the sake of clarity. For this example, the database 370 uses DBMS from Oracle running on a database server 130. The application component 330 is running on an application server 120 and communicating with a client PC 110 running a client component 310 and communicating through a browser to present medical records to the user. Row 505 contains the data set labels for the fields. The rows 510, 515, 520, 525, 530, 535, 540, 545, 550, 555, and 560 are records of data as they would be returned from Oracle if a data set was were requested for patients named Smith ordered by birth date. Column 565 as depicted in FIG. 5 is the display field of the matching results in the order of birth date if there are no changes to the database and all records are returned in a single query. Column 565 is not actually a part of the database records, but the results of a statistical function available within Oracle, and available as a display field. Column 570 is the birth date field from the database. Column 575 is the name field from the database. Column 580 is the ID field from the database.

By way of example and not by limitation, an exemplary user is a clinician whose browser is only capable of showing three records at a time. In this example, the clinician is trying to find the system identification for a man who came in for a retirement physical a few days after his birthday not long before Christmas.

With regard to the example of the data shown in FIG. 5, the clinician is presented with a prompt for query 410 in the form of a web page with a text field that allows free form questions to be entered. The clinician types the string: "last name is smith, order:birthdate" and selects an adjacent button displaying the word "go." The browser communicates the completed web form to the application component 330. The query request is received at 210 by the query request receiver 340, and a query request is produced at 420 defining the data set by a where clause in a SQL query "name LIKE 'Smith,*'" and defining a set of records for display as "pn_row_number=row_number( ) over (order by birth_dt_tm), name, person_id".

At step 220 the partitioning field is chosen as birth date since the query that the user requested had birth date ordering. At 430 the query request is modified by following steps 230, 240 and 250. At step 230 a first partitioning value estimate is determined to be the date Jul. 4, 2009 by an estimation procedure. The records within the partition using the first partitioning value estimate of Jul. 4, 2009 are counted by sending a special query to the database 370. At step 240 the partition size is determined to be eleven (11), which is too large for the maximum of ten (10) that may be returned at step 250, thus the process resumes at step 230. At step 230 a binary search for the correct value is started by taking the average of first partitioning value estimate (Jul. 4, 2009) and an estimated minimum for birth date (Sep. 16, 1920) which yields a second partitioning value estimate of Feb. 8, 1965. Another special query, counting records for the second partitioning value estimate, is sent to the database 370, and a size of five (5) is determined. At step 250 this number of records is within the range from 3 to 10, and so a query is formed at 440 to retrieve 3 records (510, 515, and 520) using the second partitioning value estimate of Feb. 8, 1965.

The process stores the last record displayed (record 520, dated May 1, 1940) to be used to form future partitions. At step 260 the first three records of this set (510, 515 and 520 shown in bold in FIG. 5) are returned to the client machine and presented to the user at 450 together with a prompt 460 which is a hyperlink of the word "next". The clinician, seeing no birth date near Christmas selects the prompt. A request for more records is received at step 270, returning the process to 430 to modify the query through steps 230, 240, and 250 for a new partitioning value estimate. At step 230 an estimate of the third partitioning value estimate is formed by taking ⅓ of the interval between the last presented birth date (May 1, 1940) and the estimated maximum Jul. 4, 2009), resulting in partitioning value estimate of May 23, 1963. A special query counting records between the last presented birth date of May 1, 1940 and the partitioning value estimate of May 23, 1963 only determines a size of one (1) at step 240, which is below the minimum of three (3). The comparison at step 250 sends the process back to step 230 which increases the estimate by another ⅓ of the interval for a partitioning value estimate of Jun. 13, 1986. A special query, counting records between May 1, 1940 and Jun. 13, 1986, determines a size of five (5) records for a partitioning value estimate of Jun. 13, 1986 at step 240, which satisfies the minimum and maximum at step 250 resulting in the query being modified to retrieve the five (5) records utilizing Jun. 13, 1986 as the partitioning value estimate. The starting point for this second query is determined using last displayed record as part of the modified query to give a starting point. The query could be as follows:

```
select
    a.*
from
    ((select pn_row_number = row_number( ) over
        (order by birth_dt_tm, name, person_id)
        ,birth_dt_tm
        ,name
        ,person_id
from person_table
where (name LIKE 'Smith,*')
    AND ((birth_dt_tm = 01-MAY-1940
            and name > "Smith, Eric"
            and person_id>654)
    OR    (birth_dt_tm = 01-MAY-1940
            and name > "Smith, Eric")
    OR    (birth_dt_tm > 01-MAY-1940))
    AND (birth_dt_tm < 13-JUN-1986)
with sqltype('f8','dq8','c100','f8'))
a)
where a.pn_row_number <=3
order by birth_dt_tm, name, person_id
with counter, format(date,';;q') go
```

In this example, notice that the last record returned in the prior query is used to form the basis of a number of conditions. This is done to establish a starting point for the present partition that excludes the data already presented. This technique incorporates the fact that the query ordered the fields in ascending order, and that in this example, there is a unique record field in the person_id field. If there is no unique field, then a number of key-fields could be assembled to obtain uniqueness.

Still with regard to the example represented by the data in FIG. 5, at 440 the 5 records (525, 530, 535, 540, and 545) are retrieved and the first three records (525, 530, and 535) are returned to the client machine at step 260, and presented to the user at 450. The clinician sees the record 525 and recognizes that the person_ID sought is 1254. After writing down the ID number, the clinician terminates the session. The advantage of the present technique is now clear. If the clinician had been distracted by an emergency lasting for an hour between the first and second pages, the present solution would still provide timely and efficient data. If there were additions or deletions to the database between the first page and the second page, the technique described herein presents newly available data that is within the range of the limitations of the next sought partition. The use of row number alone skips data under some dynamic conditions.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A computer-implemented method for retrieving records of a database comprising:
    receiving a user query request for data from a database, wherein the data is comprised of one or more fields;
    determining based on the user query request at least one of the one or more fields in the database to utilize to partition the data;

determining at least one first partitioning value within the at least one field;

counting a first number of records defined by the first partitioning value to determine a size of a first partition;

determining that the determined size of the first partition is not within a predetermined range of size;

determining at least one second partitioning value within the at least one field;

counting a second number of records defined by the second partitioning value to determine a size of a second partition;

determining that the determined size of the second partition is within the predetermined range of size; and utilizing the at least one second partitioning value in conjunction with the query request to return a data set.

2. The method of claim 1, wherein the size of the first partition is determined by counting the number of records before the at least one first partitioning value and the size of the second partition is determined by counting the number of records before the at least one second partitioning value.

3. The method of claim 1, wherein the size of the first partition is determined by counting the number of records after the at least one first partitioning value and the size of the second partition is determined by counting the number of records after the at least one second partitioning value.

4. The method of claim 1, wherein there are two first partitioning values.

5. The method of claim 4, wherein the size of the first partition is determined by counting the number of the records between the two first partitioning values.

6. The method of claim 1, wherein said determining at least one second partitioning value within the at least one field comprises utilizing an average of the at least one first partitioning value and an estimated minimum value.

7. The method of claim 1, further comprising receiving a query request for additional records.

8. The method of claim 7, further comprising determining at least one subsequent partitioning value, wherein said at least one subsequent partitioning value utilizes the last record returned as the starting point for determining the at least one subsequent partitioning value.

9. The method of claim 1, further comprising presenting the returned data set to a user.

10. The method of claim 1, wherein the records returned are the records that may be displayed in a browser.

11. A computerized system having a processor and at least one computer storage medium, for retrieving records of a database comprising:

a client component;

an application component coupled to said client component comprising (a) a user query request receiver configured to receive a query request for data from a database, wherein the data is comprised of one or more fields, (b) an adaptive query modifier coupled to said query request receiver configured to determine at least one first partitioning value to partition the data based on one or more partition fields in the database based on the user query request and configured to determine whether a size of the partition is within a predetermined range of size, wherein the size of the partition is determined by counting a number of records within the partition defined by the partitioning value, and (c) a query output subcomponent coupled to said adaptive query modifier configured to send a modified query utilizing said first partitioning value in conjunction with said query request; and a database component coupled to said application component.

12. The system of claim 11, wherein said adaptive query modifier is configured to determine said at least one first partitioning value through binary search by first taking the average of a first partitioning value estimate and an estimated minimum value.

13. The system of claim 11, wherein said adaptive query modifier is configured to determine said at least one first partitioning value through the use of statistics of said partitioning value.

14. The system of claim 11, wherein said partition is formed relative to at least one second partitioning value.

15. The system of claim 11, wherein said query request receiver is configured to receive a query request for data relative to a prior query request.

16. The system of claim 11, wherein said query output subcomponent is configured to send a modified query utilizing the at least one second partitioning value.

17. A computer-implemented method of presenting records of a database to a user comprising:

providing a user query prompt;

producing a user query request for data from a database, wherein said data is comprised of one or more fields;

utilizing the user query request to modify said user query request to produce a modified query, wherein the one or more fields are used to partition the data with at least one first partitioning value such that a resulting partition is determined to be of size within a predetermined range of size, wherein the size of the partition is determined by counting a number of records within the partition defined by the partitioning value;

retrieving a set of records from a database using said modified query, wherein the set of records returned includes the number of records that may be displayed in a browser; and presenting said set of records to a user.

18. The method of claim 17, wherein said determination that a resulting partition is of size within a predetermined range of size comprises a query which returns record count, but not the matching records themselves.

19. The method of claim 17, wherein said producing of a query request comprises translation into a structured query language.

20. The method of claim 17, further comprising prompting a user to request additional records.

* * * * *